(12) United States Patent
McDonough (10) Patent No.: US 6,782,319 B1
(45) Date of Patent: Aug. 24, 2004

(54) METHOD FOR ORGANIZING MAP DATA

(75) Inventor: William G. McDonough, Glen Ellyn, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 10/304,229

(22) Filed: Nov. 26, 2002

(51) Int. Cl.[7] .......................... G01C 21/00; G06F 17/30
(52) U.S. Cl. ...................................... 701/208; 707/102
(58) Field of Search ................................ 701/200, 203; 340/990, 995.1; 707/102, 104.1

(56) References Cited

U.S. PATENT DOCUMENTS

| | | | |
|---|---|---|---|
| 4,888,698 A | 12/1989 | Driessen et al. | 364/443 |
| 4,937,572 A | 6/1990 | Yamada et al. | 340/995 |
| 5,170,353 A | 12/1992 | Verstraete | 364/444 |
| 5,513,110 A | 4/1996 | Fujita et al. | 364/449 |
| 5,953,722 A | 9/1999 | Lampert et al. | 707/100 |
| 5,963,956 A | 10/1999 | Smartt | 707/104 |
| 5,968,109 A | 10/1999 | Israni et al. | 701/208 |
| 5,974,419 A | 10/1999 | Ashby | 707/100 |
| 6,035,299 A | 3/2000 | White et al. | 707/101 |
| 6,112,153 A | 8/2000 | Schaaf et al. | 701/200 |
| 6,112,200 A * | 8/2000 | Livshutz et al. | 707/4 |
| 6,122,594 A | 9/2000 | Tamaki et al. | 701/208 |
| 6,141,454 A | 10/2000 | Seymour et al. | 382/243 |
| 6,233,521 B1 | 5/2001 | Nomura | 701/208 |
| 6,324,470 B1 | 11/2001 | White | 701/209 |
| 6,430,497 B1 | 8/2002 | Gaertner et al. | 701/200 |
| 6,473,691 B1 | 10/2002 | Winter et al. | 701/208 |
| 6,484,090 B1 | 11/2002 | Lahaije et al. | 701/208 |
| 6,546,334 B1 | 4/2003 | Fukuchi et al. | 701/208 |
| 6,591,270 B1 | 7/2003 | White | 707/101 |
| 2001/0051851 A1 | 12/2001 | Suzuki et al. | 701/208 |
| 2002/0147545 A1 | 10/2002 | Norimoto | 701/211 |
| 2003/0028315 A1 | 2/2003 | Miyahara | 701/208 |

FOREIGN PATENT DOCUMENTS

WO    WO 99/58934    11/1999

OTHER PUBLICATIONS

Samet, Hanan: "The Strategies for Optimizing the Use of Redundancy in Spatial Databases", *The Design and Analysis of Spatial Data Structures*, ISBN 0-201-50255-0, Chapter 2.4, no date.

Matsuyama, et al.: "A file Organization for Geographic Information Systems Based on Spatial Proximity", *Computer Vision, Graphics, and Image Processing* 26, 303–318. 1984.

* cited by examiner

*Primary Examiner*—Michael J. Zanelli
(74) *Attorney, Agent, or Firm*—Jon D. Shutter; Frank J. Kozak; Lawrence M. Kaplan (57) ABSTRACT

A method of organizing map data on a physical storage medium is disclosed. The map data represents geographic features located in a geographic region. The method identifies at least one dense area in the geographic region. The map data representing the geographic features within the dense area have a data size exceeding a predetermined maximum size for a predetermined sized geographic area of the region. The method subdivides the map data representing the geographic features within the dense area into parcels so that the portion of map data contained in the parcel is close to a predetermined parcel size. The method subdivides the map data less the map data representing the dense area into parcels so that the portion of map data contained in the parcel is close to the predetermined parcel size. Additionally, the method locates the map data in each parcel together on the physical storage medium.

27 Claims, 6 Drawing Sheets

METHOD FOR ORGANIZING MAP DATA

BACKGROUND OF THE INVENTION

The present invention relates to a method and system for the organization and storage of map data that facilitate use of the map data by navigation application programs such as those in navigation systems. The present invention also relates to a physical storage medium having map data stored thereon having the aforementioned method of organization.

Many navigation systems use map data that are stored on read-only disks (e.g., CD-ROM disks, DVD-ROM disks, etc.) or hard disks. An important factor that affects the performance of some navigation system features, such as map display, is the time required to fetch the map data from the disk. A large portion of the time required to fetch map data is attributable to the seek time of the device (i.e., the time for the read head of the navigation system to move from a current track to the track where the data are located). This factor is important for CD-ROM and DVD-ROM disks but also applies to some extent to hard disks.

Because seek time accounts for a large portion of the time required to fetch data from a disk, techniques for organizing map data have been developed that reduce the number of seeks (and thus the total seek time) for a given request thereby helping to improve navigation system performance. One way to reduce the number of seeks when accessing map data for certain navigation system functions is to organize the map data spatially. In general, when map data are organized spatially, geographic features that are close together physically in the geographic region are represented by data records that are physically (or logically) close together in the map database (and possibly also close together on the medium upon which the map data are stored).

There are various methods by which data that represent geographic features can be organized spatially. One of the ways that data that represent geographic features can be organized spatially is to first identify groups of data entities that represent geographic features that are located close together and then arrange the groups spatially. The groups of data may be referred to as "parcels," "buckets," or "map regions," although other terminology may also be used. The data entities within each group may also be organized spatially or the data entities within a group may be organized according to another arrangement. Methods for organizing map data spatially are described in U.S. Pat. Nos. 5,968,109 and 5,974,419, and U.S. patent application Ser. No. 09/629,224 entitled "Method for Organizing Map Data," filed Jul. 28, 2000, now U.S. Pat. No. 6,591,270 the entire disclosures of which are incorporated by reference herein.

Some map data parcelization techniques attempt to achieve uniform data size parcels (e.g., 32 or 64 kilobytes per parcel) or fixed geographic size parcels (e.g., 0.02 degree delta latitude by 0.03 degree delta longitude or some other latitude/longitude "rectangle"). A disadvantage of uniform data size parcels is that when a map displaying rectangle spans several parcels that are not adjacent on the disk, several seeks are required to fetch the requested data, thereby possibly adversely affecting navigation system performance. On the other hand, a disadvantage of uniform geographic size parcels is that the data sizes of parcels vary widely from densely populated areas to sparsely populated areas. If the area corresponding to each uniform geographic size parcel is too small, the overhead necessary to store information about each parcel becomes excessive. However, if the area corresponding to uniform geographic size parcel is too large, the amount of data contained in densely populated regions may exceed the data size limitations of a parcel. For example, if two-byte offsets are used to locate byte positions of a parcel, then the inherent limit of 64 kilobytes constrains the amount of data that can be stored in a parcel.

Accordingly, there is a need for an improved way to organize map data that reduces the number of fetches needed to obtain the data required to represent an area while accommodating wide variations in data density across a region.

SUMMARY OF THE INVENTION

To address these and other objectives, the present invention comprises a method of organizing map data on a physical storage medium. The map data represents geographic features located in a geographic region. The method identifies at least one dense area in the geographic region. The map data representing the geographic features within the dense area have a data size exceeding a predetermined maximum size for a predetermined sized geographic area of the region. The method subdivides the map data representing the geographic features within the dense area into parcels so that the portion of map data contained in the parcel is close to a predetermined parcel size. The method subdivides the map data less the map data representing the dense area into parcels so that the portion of map data contained in the parcel is close to the predetermined parcel size. Additionally, the method locates the map data in each parcel together on the physical storage medium.

DETAILED DESCRIPTION OF THE PRESENTLY PREFERRED EMBODIMENTS

Parcelization is the process of dividing a map database of a geographic region into spatial parcels. Generally, it is desired to store data representing geographic features, such as roads, spatially based upon the physical proximity of the geographic features that they represent. Data records that are physically (or logically) close together in the map database (and possibly also close together on a storage medium upon which the map data are stored) represent geographic features that are close together physically in the geographic region. To spatially organize data representing geographic features, the data representing the geographic features are organized into parcels. Each parcel of data includes data representing features that are located physically proximate to each other in the geographic region. As described further below, each parcel includes data that represent physical features encompassed within a geographic area of a size, shape and position determined by a parcelization method. A computing platform performs the parcelization method. The computing platform accesses map data stored in a general data format from a storage medium associated with the computing platform to perform the parcelization process thereby forming a derived database in which the map data are organized into parcels. The derived database can be used to perform navigation-related functions.

Figure 1:
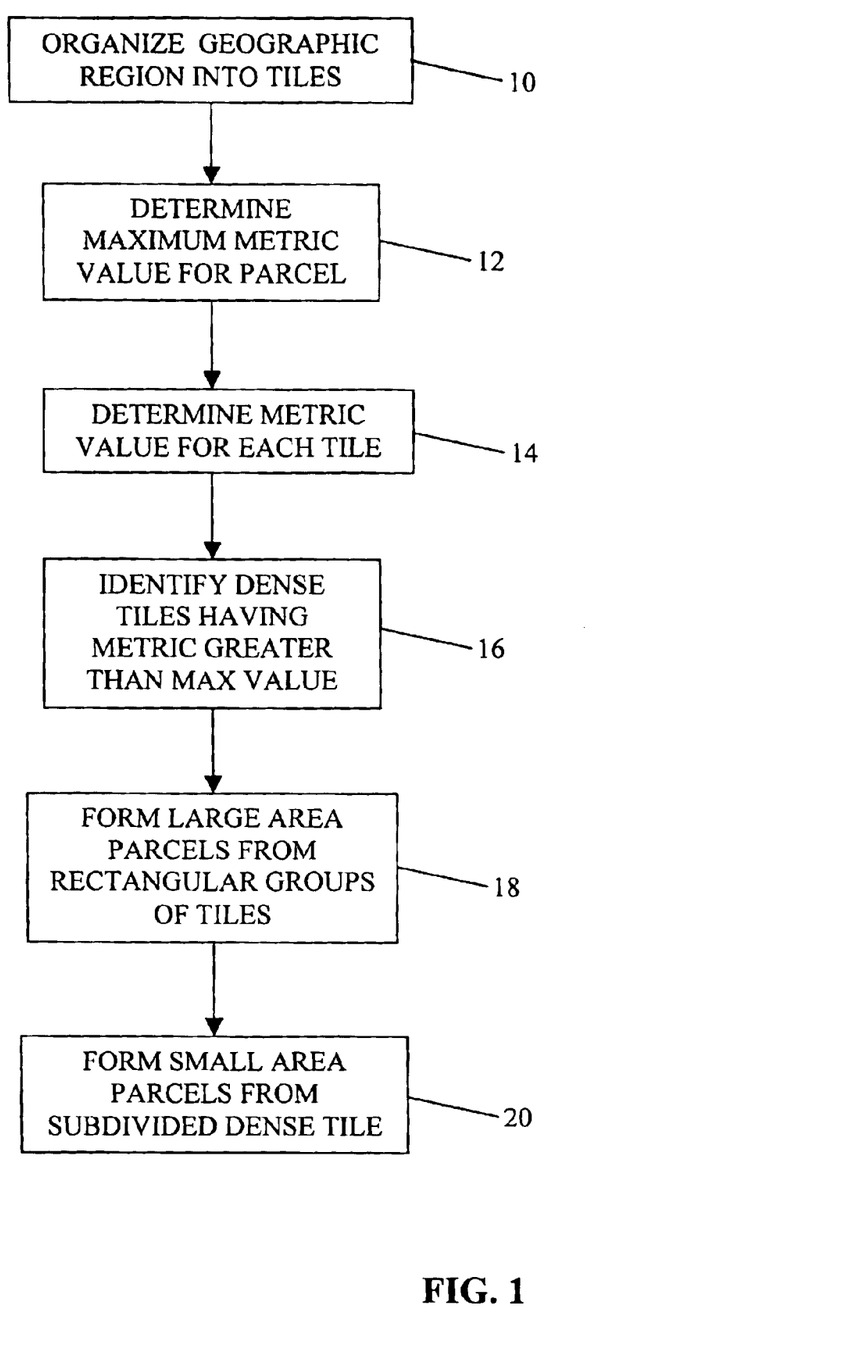
FIG. 1 is a flow chart of a parcelization method according to one embodiment.

FIG. 1 illustrates one embodiment of the parcelization method. Briefly, the parcelization method is a two level parcelization scheme. The method first identifies dense geographic areas of the geographic region, such as a metropolitan area. For convenience, the dense geographic area will be considered as being represented by a dense portion of the geographic database because the database contains a considerable amount of data to represent the geographic features present in the dense geographic area. After identifying the dense areas, the parcelization method organizes the data representing each of the dense areas into a plurality of small area parcels, and the parcelization method organizes the data of the geographic database less the data representing the dense areas into a plurality of large area parcels. The terms large area parcel and small area parcel are used for convenience. Large area parcel refers to a parcel that includes data that represent physical features encompassed within a geographic area of a relatively large size. Small area parcel refers to a parcel that includes data that represent physical features encompassed within a geographic area of a relatively small size. Large area parcels include data that represent physical features encompassed with a geographic area having a larger size that that of small area parcels.

Figure 2:
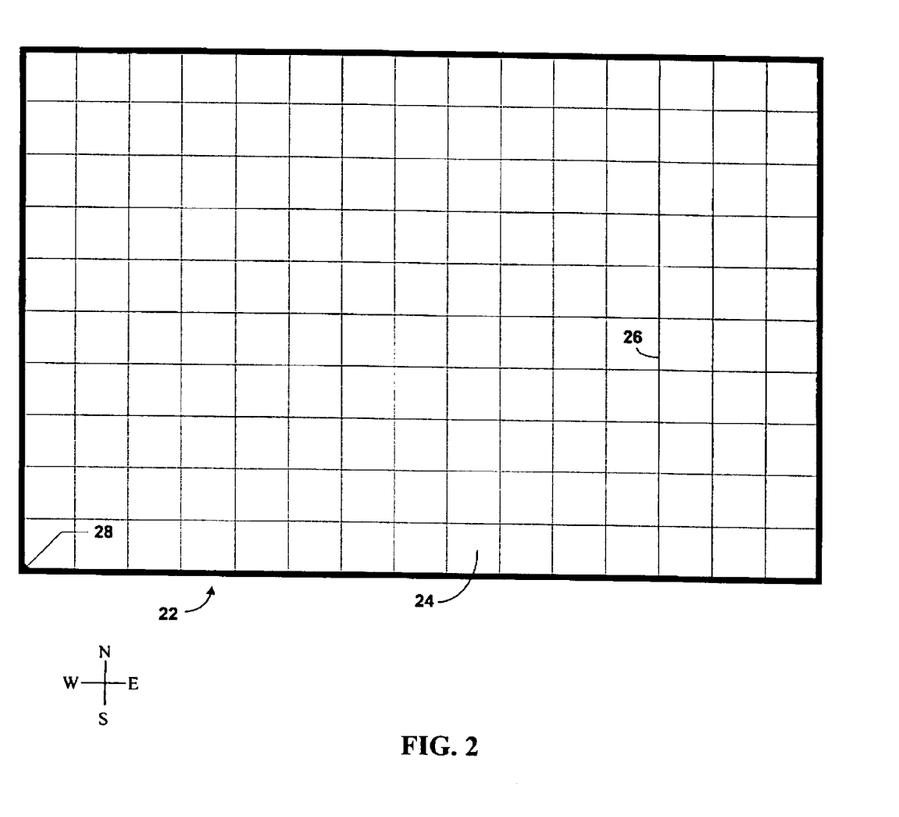
FIG. 2 is a grid of tiles covering a geographic region represented by a geographic database.

Referring to FIG. 1, the parcelization method begins by organizing the geographic database representing the geographic region into a grid of tiles at step 10. A tile is a spatial unit by which geographic data are organized, subdivided and stored. FIG. 2 illustrates one embodiment of a regular grid 22 of tiles 24 covering the geographic region represented by the geographic database. The grid 22, illustrated in FIG. 2, divides the geographic region represented by the geographic database into fixed sized, rectangular areas. Each tile 24 contains data that represent the physical features encompassed within the geographic area defined by the tile boundaries 26 provided by the grid 22. An origin 28 of the grid begins at the south-western-most point of the grid 22, and all of the tiles 24 may be identified in terms of their location from the origin 28.

In one embodiment, the grid 22 is a global grid of tiles that divides the globe into a plurality of tiles. The global grid has fixed sized (in degrees) tiles following the latitude and longitudinal grid. The tiles have a north-south dimension of 0.32768 degrees (or 32 k Navigation Technology Units ("NTUs" hereinafter)) and an east-west dimension of 0.49152 degrees (or 48 k NTUs). The tiles have an actual tile dimensions of 36.4 km by 54.6 km at the equator with the east-west dimensions decreasing at higher latitudes as the cosine of the latitude, reaching 27.3 km at sixty degrees north, while the north-south dimension remains constant. For the present embodiment, the origin of the tile grid is eighty degrees south, thirty degrees west. The coordinates of the grid are always positive, increasing to the north and east. The global grid is 488 tiles north by 732 tiles east for a total of 357,216 tiles. In this example, the northern limit of the grid is 80.236 degrees north latitude. The eastern limit of the grid is 30.207 degrees west longitude. In one embodiment, the global grid is used only to define tile boundaries. An actual geographic database representing a geographic region will comprise the tiles that cover that specific geographic region.

After establishing the grid 22 of tiles 24, the parcelization method uses the tiles 24 to form parcels. A parcel can be defined as one tile 24, a rectangular group of tiles 24, or a rectangular subset of a tile 24. Large area parcels comprise at least one tile, and small area parcels comprise a subset of one tile. To determine how to form the parcels from the tiles 24, the desired data size for the parcel is determined. For example, the parcel may have a maximum data size of approximately 100 kilobytes or any other appropriate data size, e.g., 32 kilobytes, 64 kilobytes, 128 kilobytes, etc. (When determining a data size, some percentage may be reserved for parcel overhead.) The tiles are grouped or divided to obtain parcels having approximately the desired data size. In one embodiment, the parcelization method groups or divides tiles to provide parcels having a data size close to but not exceeding a maximum data size for a parcel.

Rather than trying to determine the data size of the data within the boundaries of the tile directly, a metric estimates the ultimate data size of the data contained within a tile. The metric is a function of the number of data elements of various types contained in the tile. In one embodiment, the metric is the number of nodes in the tile, and this metric correlates fairly well with the eventual parcel data size. The metric may also be a function of the number of any database attribute or combination of attributes including nodes, road segments, points of interests, polygons representing geographic entities such as forests and lakes, polylines representing geographic entities such as rivers or any other geographic database attribute.

Returning to FIG. 1, the parcelization method determines a minimum and maximum metric value for the parcels at step 12. In one embodiment, the desired parcel data size is approximately 100 k bytes, but the target size may be other values. The maximum and minimum metric values are selected to provide parcels having approximately the desired parcel data size. In one embodiment, the minimum metric value is over half of the maximum metric value. In one embodiment, the goal is to have approximately the same metric value for each parcel in the database within a factor of two. In addition to determining the maximum and minimum metric values for the parcels, the parcelization method defines a maximum aspect ratio for the parcels. The aspect ratio is the ratio of the largest dimension to the smallest dimension of the rectangle comprising the parcel. A square has an aspect ratio of one. A low aspect ratio for the parcels provides advantages for applications of the geographic database. For example, the low aspect ratio for the parcels makes route calculation more efficient by minimizing the number of parcels that must be accessed along a route. In one embodiment, the maximum aspect ratio for a parcel is approximately four.

Referring to FIG. 1, the parcelization method determines the metric value for each tile in the database at step 14. After the metric values are determined for all of the tiles, each metric value is compared to the maximum metric value for a parcel. If the metric value of the tile is greater than the maximum metric value for a parcel, the method identifies the tile as a dense tile at step 16. The dense tile contains a larger amount of data than appropriate for a single parcel. Additionally, the dense tile contains data representing a dense geographic area of the geographic region, such as a metropolitan area.

After the dense tiles are identified, the method forms large area parcels from rectangular groups of tiles at step 18, and the method forms small area parcels by subdividing the dense tiles at step 20. Step 18 will be described in detail below in conjunction with FIGS. 3 and 4; step 20 will be described in detail below in conjunction with FIGS. 5 and 6. The steps 18 and 20 may be performed in any order.

Figure 3:
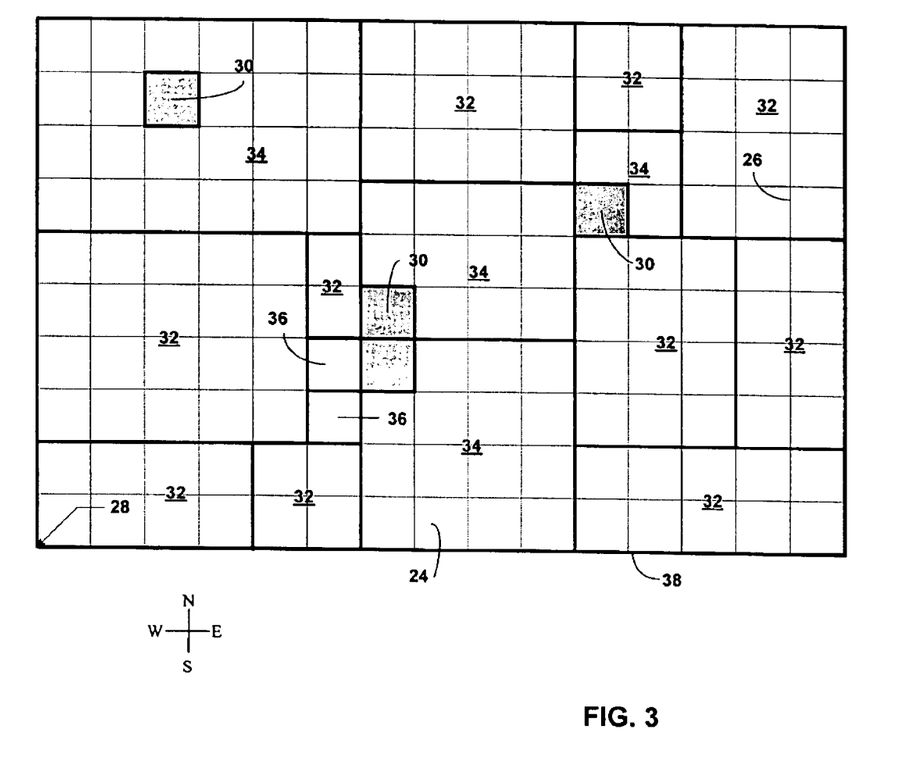
FIG. 3 is the grid of tiles of FIG. 2 containing large area parcels, single tile large area parcels and dense tiles.

FIG. 3 illustrates examples of large area parcels and dense tiles in the grid 22 of tiles 24 of FIG. 2. In FIG. 3. the dense tiles 30 that need to be subdivided into small area parcels are shown as gray-shaded to visually distinguish them. FIG. 3 also illustrates several large area parcels 32, 34 and 36. Large area parcels 32 comprise a rectangular group of tiles 24. Large area parcels 36 comprise a single tile 24. Large area parcels 34 comprise a rectangular group of tiles 24 including a dense tile 30. The dense tile 30 may be located within the geographic area encompassed by the large area parcel 34, but the data of the dense tile 30 is not included with the data of the large area parcel 34. The effective metric value for the large area parcel 34 is the total sum of all the metric values of the tiles within the rectangle encompassing the large area parcel 34 minus the metric values for any dense tiles 30 contained within the rectangle. The large area parcel 34 including the dense tile 30 may be considered as having a hole within the large area parcel 34.

As illustrated in FIG. 3, the large area parcels 32, 34 and 36 have boundaries that follow the grid lines 26. Thus, the large area parcels 32, 34 and 36 and dense tiles 30 cover the entire database representing the geographic region without overlapping. Additionally, because the large area parcels have boundaries that follow the grid lines 26, the large area parcels have dimensions in the east-west direction that are multiples of the dimension of the tile in the east-west direction and dimensions in the north-south direction that are multiples of the dimension of the tile in the north-south direction.

Figure 4:
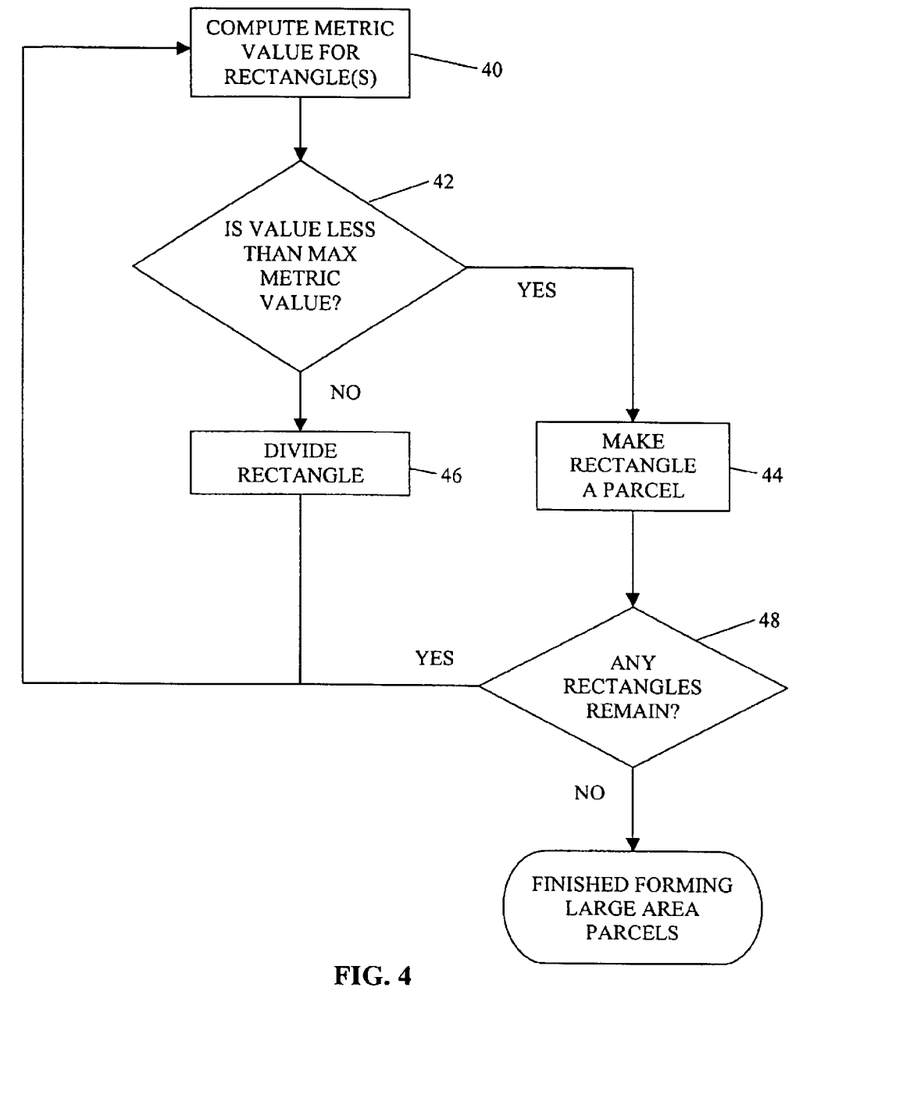
FIG. 4 is a flow chart of a method for forming large area parcels according to one embodiment.

FIG. 4 illustrates one embodiment of the parcelization method for forming the large area parcels 32, 34 and 36. Briefly, the following method forms large area parcels by dividing the geographic database along tile boundaries. The method begins with the entire geographic region represented by the geographic database as a single rectangle 38 in FIG. 3. At step 40, the method computes the metric value of the rectangle 38. The rectangle 38 has a metric value equal to the sum of the metric value of each tile 24 within the rectangle 38 less the metric values of the dense tiles 30 within the rectangle 38. Step 42 determines whether the metric value for the rectangle 38 is less than the maximum metric value for a parcel. If the metric value of the rectangle 38 is less than the maximum metric value for a parcel, a large area parcel is formed from the rectangle 38 at step 44.

If the metric value for the rectangle 38 is larger than the maximum metric value for a parcel, the method divides the rectangle 38 along tile boundaries 26 into two smaller rectangles at step 46. To determine along which grid line to divide the rectangle 38, the method determines whether the metric value of the rectangle is greater than three times the maximum metric value or less than three times the minimum metric value for a parcel. If so, the method divides the rectangle to provide approximately half of the metric value of the rectangle on either side of the dividing line. If not, the method divides the rectangle to provide approximately one third of the metric value of the rectangle on one side and two thirds of the value on the other side of the dividing line. The dividing line is chosen to be parallel to the shorter side of the rectangle.

For the dividing step 46, the method tests the aspect ratio of the two rectangles of the contemplated division. If the division produces new rectangles that have aspect ratios larger than the maximum aspect ratio for a parcel, a different division line is chosen. In one embodiment, the method tests the aspect ratio of each rectangle ($AR_{test}$) of the contemplated division to determine whether its value is larger than the product of the maximum aspect ratio ($AR_{max}$) and the rectangle's metric value divided by the minimum metric value for a parcel ($M_{min}$). In equation form the test is whether ($AR_{test} > AR_{max} * metric_{test}/M_{min}$). If the aspect ratio of either rectangle of the contemplated division is too high, the division line is altered. If the division was to provide approximately one third on one side and two thirds on the other side, the division line is moved to provide half of the calculated metric value on either side. If the division was to provide approximately one half of the calculated metric value on each side, the division line is moved toward the center of the rectangle until the aspect ratio is acceptable.

In FIG. 4, after the rectangle 38 has been divided in step 46, the method returns to step 40. The method repeats steps 40–46 for each of the rectangles from the division. At step 48, the method determines whether a rectangle remains from a prior division that has not been formed into a large area parcel. If so, steps 40–46 repeat for the rectangle. If not, the process for forming large area parcels has been completed.

Figure 5:
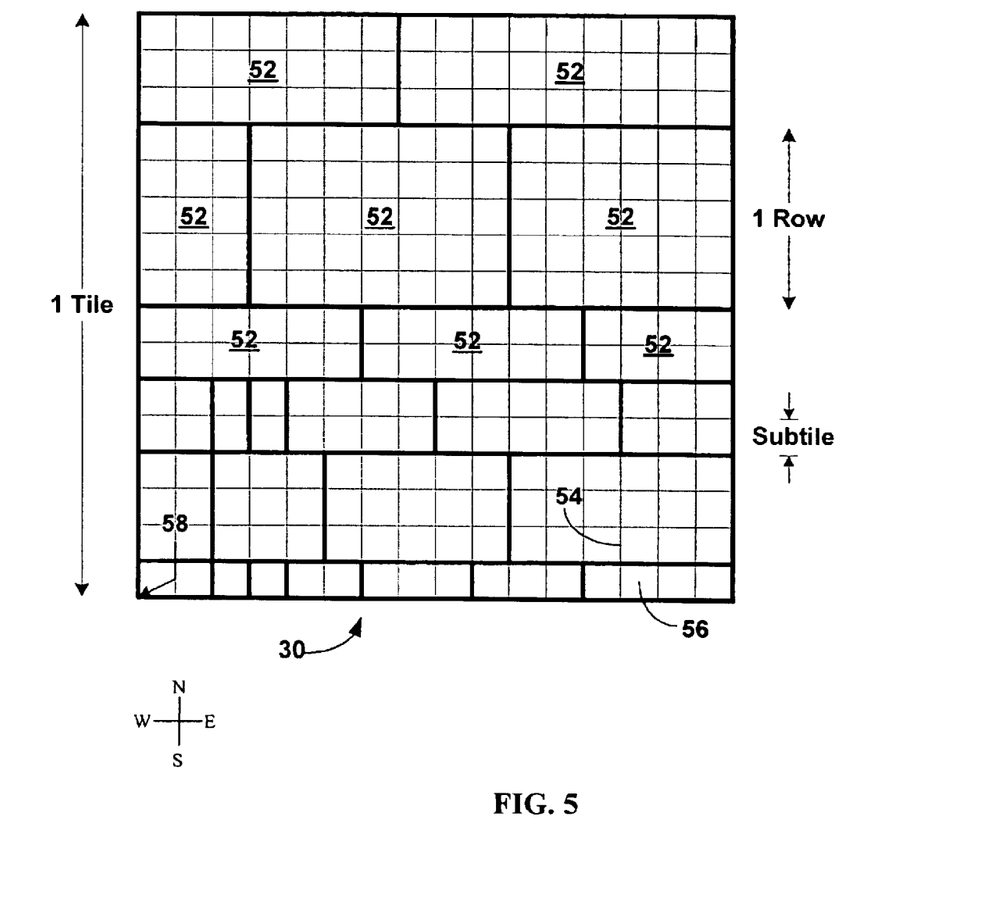
FIG. 5 is a dense tile subdivided into parcels.

Returning to FIG. 1, the parcelization method subdivides the dense tiles 30 into small area parcels at step 20. FIG. 5 illustrates a dense tile 30 subdivided into rows of small area parcels 52. The dense tile 30 comprises the small area parcels 52 formed along boundaries of a grid 54 of subtiles 56. The grid 54 provides a plurality of fixed sized, rectangular subtiles 56 within the dense tile 30. As described above, the dense tile 30 has a north-south dimension of 0.32768 degrees (or 32 k NTUs) and an east-west dimension of 0.49152 degrees (or 48 k NTUs). Each subtile 56 has a north-south dimension that is $1/16^{th}$ of the north-south dimension of the tile (or 2 k NTUs) and an east-west dimension that is $1/16^{th}$ of the east-west dimension of the tile (or 3 k NTUs). At 45N latitude the subtile 56 is approximately 2.27 km×1.6 km.

Referring to FIG. 5, an origin 58 of the grid of subtiles 56 begins at the south-western-most point of the grid 54, and all of the subtiles 56 may be identified in terms of their location from the origin 58. As illustrated in FIG. 5, the small area parcels 52 are arranged in raster fashion as east-west rows with each small area parcel 52 within the same row having equal north-south dimensions (same number of subtiles 56 high). Different rows may have different north-south dimensions that are multiples of one subtile high. Because the small area parcels 52 have boundaries that follow the subtile grid lines 54, the small area parcels 52 have dimensions in the east-west direction that are multiples of the dimension of the subtile 56 in the east-west direction. The small area parcels 52 have dimensions in the north-south direction that are multiples of the dimension of the subtile in the north-south direction. The maximum aspect ratio for a small area parcel 52 is again limited by a maximum value, such as four.

Figure 6:
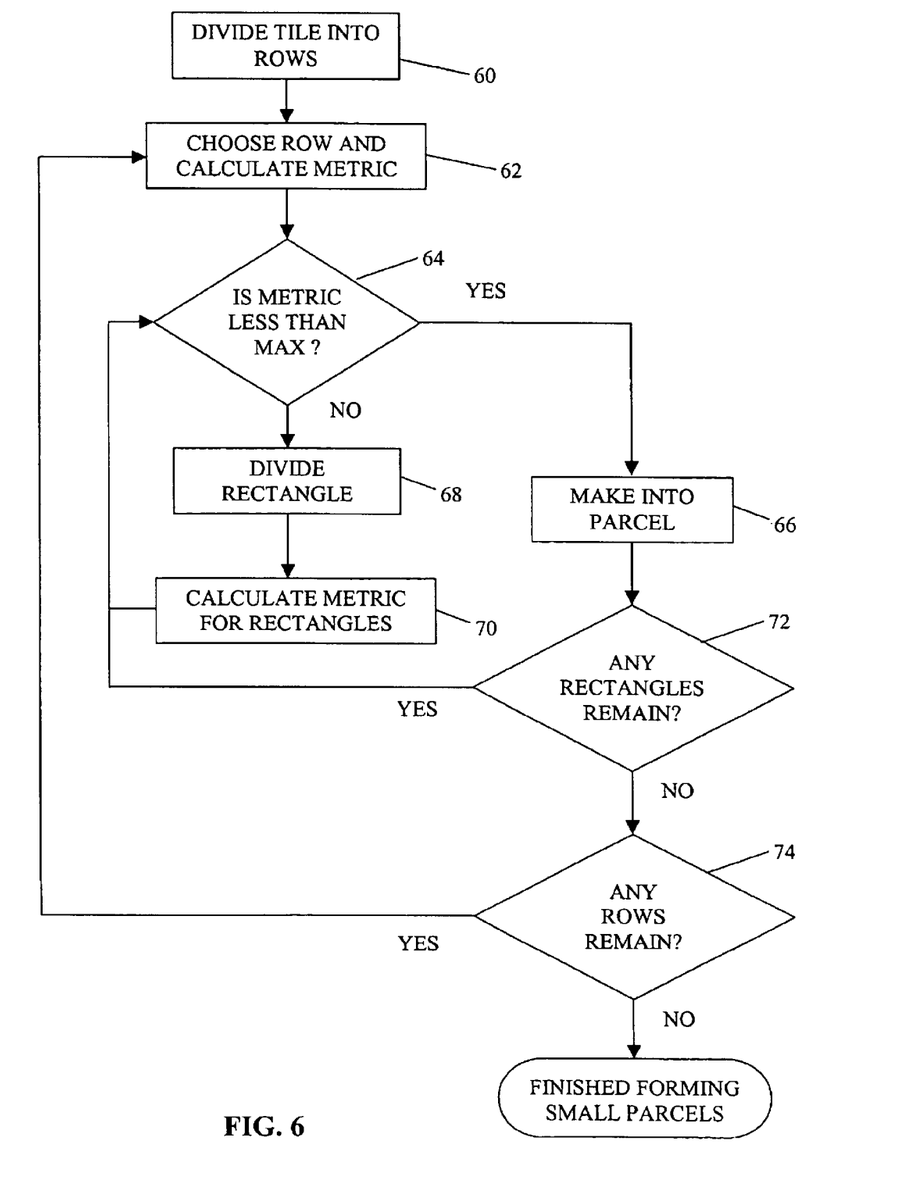
FIG. 6 is a flow chart of a method for forming small area parcels from a dense tile according to one embodiment.

FIG. 6 illustrates one embodiment of the parcelization method for forming small area parcels 52 from the dense tile 30. Briefly, the following method divides the dense tile 30 along subtile boundaries 54 into east-west rows and then forms the small area parcels 52 by dividing the rows along north-south subtile boundaries 54. Referring to FIG. 6, the method divides the dense tile 30 into rows at step 60. The north-south dimension of the rows is chosen to allow the rows to be divided into small area parcels 52 with acceptable aspect ratios. Areas of the dense tile 30 having dense data distributions will be made into rows having a smaller height than areas of the dense tile 30 having a less dense data distribution. According to one embodiment for dividing the dense tile 30 into rows, the method first divides the dense tile 30 into north-south slices one subtile wide. The method then computes the metric value for each of the north-south slices. If the metric value of any of the north-south slices is greater than the maximum metric value for a parcel, the dense tile 30 is divided into two rows by finding the east-west line following the subtile boundaries that provides approximately half of the metric value on each side of the dividing line. The resulting two rows are each processed in the same manner as described above. The method divides each row until none of the north-south slices of the resulting rows have a metric value greater than the maximum metric value for a parcel.

After the dense tile 30 has been divided into rows, each row will be organized into small area parcels 52. The method chooses one of the rows and treats the entire row as a single rectangle. At step 62, the method calculates the metric value for the rectangle. Step 64 determines whether the metric value for the rectangle is less than the maximum metric value for a parcel. If the metric value of the rectangle is less than the maximum metric value for a parcel, the rectangle is made into a small area parcel 52 at step 66. If the metric value for the rectangle is larger than the maximum metric value for a parcel, the rectangle is divided into two rectangles along north-south subtile boundaries 54 at step 68. To determine along which grid line 54 to divide the rectangle, the method determines whether the metric value of the rectangle is greater than three times the maximum metric value for a parcel or less than three times the minimum metric value for a parcel. If so, the rectangle is divided to provide approximately half of the metric value on either side of the north-south dividing line. If not, the rectangle is divided to provide approximately one third of the metric value on one side and two thirds of the metric value on the other side of the north-south dividing line.

For the dividing step 68, the method tests the aspect ratio of the two rectangles of the contemplated division. If the division produces new rectangles that have aspect ratios larger than the maximum aspect ratio for a parcel, a different division line is chosen. In another embodiment, the method tests the aspect ratio of each rectangle ($AR_{test}$) of the contemplated division to determine whether its value is larger than the product of the maximum aspect ratio ($AR_{max}$) and the rectangle's metric value divided by the minimum metric value for a parcel ($M_{min}$). In equation form the test is whether ($AR_{test} > AR_{max} * metric_{test}/M_{min}$). If the aspect ratio of either rectangle of the contemplated division is too high, the division line is altered. If the division was to provide approximately one third on one side and two thirds of the metric value on the other side, the division line is moved to provide half on either side. If the division was to provide approximately one half of the metric value on each side, the division line is move toward the center of the rectangle until the aspect ratio is acceptable.

In FIG. 6, after the rectangle has been divided in step 68, the method calculates the metric value for each of the resulting rectangles at step 70 and the metric value of each rectangle is compared to the maximum metric value for a parcel at step 62. Each of the rectangles is processed as described above until the row has been organized into small area parcels 52. If no rectangles remain that have not been organized into small area parcels 52 at step 72, the method determines whether all of the rows of the dense tile 30 have been organized into small area parcels 52 at step 74. If some rows remain unorganized into small area parcels 52, the method returns to step 62 using the next row and repeating the process for organizing the row into small area parcels 52 as described above with steps 62–72. After all of the rows have been organized into small area parcels 52, the method has finished forming small area parcels 52 from the dense tile 30. All of the dense tiles 30 are organized into small area parcels 52 following the steps of FIG. 6.

Once all the large area parcels 32, 34, 36 and small area parcels 52 have been defined, they are organized on a physical storage media, e.g., the CD-ROM disk, the DVD-ROM disk, hard disk or other media. (If a CD-ROM disk or DVD disk is used, it may be rewritable or not rewritable.) In one embodiment, the large area parcels and small area parcels are organized beginning with the parcel that represents the data contained in the rectangular area at one corner of the geographic region represented by the geographic database, such as the south-west corner. The large area parcels and small area parcels are ordered such that spatially adjacent parcels are stored close to one another so seek time is minimized. The parcels may be ordered using Peano-N key, Morton order or any ordering scheme. In one embodiment, if a dense tile was subdivided, all of the small area parcels for the subdivided tile are stored before the next adjacent parcel.

Each of the large area parcels and small area parcels is identified with a unique parcel ID. In one embodiment, the parcel ID indicates the geographic location of the parcel. For large area parcels, the parcel ID comprises a tile address expressed as north and east deltas in tile units from the southwest corner or origin of the geographic region. For small area parcels formed by subdividing dense tiles, the parcel ID comprises the tile address and a raster address expressed as north and east deltas of subtile units from the southwest corner of the dense tile. One bit of the ID indicates whether the parcel is a small area parcel having both the tile address and the raster address.

Alternatives

The illustrated parcelization method described above has numerous alternatives; some of these alternative embodiments are described briefly below.

The above parcelization method begins by organizing the geographic database representing the geographic region into a grid of tiles (see FIG. 1, step 10 and FIG. 2). In one embodiment, the parcelization method divides the geographic region represented by the geographic database into the grid of tiles. Alternatively, the parcelization method places a predetermined grid of tiles having a predetermined size and shape over the geographic region. The grid described above in conjunction with FIG. 2 comprises fixed size rectangular tiles. In alternative embodiments, the grid may be comprised of tiles having other shapes and other sizes. Generally, the preferred shape for the tiles is a rectangular shape, such as squares and rectangles although other shapes may be used. Alternatively, tiles may have irregular shapes. For example, the tiles may be defined by county or municipal boundaries. The size of the tiles may be determined depending on several factors including the size of the geographic region represented by the geographic database, the amount of data in the geographic database, the number of tiles desired, the density of data for a metropolitan area or any other factor. In one embodiment, the tile size is selected to be approximately an average size of a typical metropolitan area. In another embodiment, the tile size is selected as a binary power of the unit of measurement to allow easy manipulation with the computing platform. An advantage of the fixed sized rectangular tiles as depicted in FIG. 2 is the ability to easily convert between a location in latitude and longitude coordinates and the tile containing the location using the latitude and longitude coordinates of the origin and the size of the tiles.

The above parcelization method identifies dense geographic areas of the geographic region by identifying dense tiles having a metric value larger than the metric value for a parcel (see FIG. 1, steps 10–16). Alternatively, instead of following steps 10–16 of FIG. 1, another embodiment may simply identify metropolitan areas following municipal boundaries as dense areas. The alternative method may then subdivide the metropolitan areas into small area parcels in a similar manner as described for the dense tiles.

In another alternative embodiment, in addition to identifying dense tiles at step 16, the parcelization method identifies and forms single tile large area parcels. Single tile large area parcels comprise a single tile. In the alternative embodiment, if the metric value for the tile is within the range of the minimum metric value and maximum metric value for a parcel, the tile is formed into a single tile large area parcel.

The above parcelization method forms large area parcels by dividing the geographic database along tile boundaries as described in conjunction with FIG. 4. In addition to the above method, other alternative methods are possible for forming the large area parcels. In one alternative embodiment, the large area parcels are formed by dividing the geographic database along division lines that do not correspond with tile boundaries. In another embodiment, the large area parcels are formed from aggregating adjacent tiles such that the sum of metric values of the group of tiles is within the range of the minimum metric and maximum metric value for a parcel. In another embodiment, the large area parcels may have shapes other than rectangular. In yet another embodiment, the large area parcels may not only include the geographic area of dense tiles but not the dense tile data but also the geographic area of single tile large area parcels but not the single large area tile parcel data. In this embodiment, the metric value for the rectangle of the large area parcel is the metric value for the entire rectangle minus the metric value of any dense tiles and minus the metric value of any single tile large area parcels included in the rectangle. In a further alternative embodiment, the large area parcels do not include the geographic area of dense tiles.

The above parcelization method forms small area parcels by dividing the dense tile along subtile boundaries into rows of small area parcels as described in conjunction with FIGS. 5 and 6. In addition to the above method, other alternative methods are possible for forming the small area parcels. In one embodiment, the dense tile may be divided into rows following any appropriate method. In another embodiment, the parcels are not arranged in raster fashion as east-west rows of parcels. In an alternative embodiment, the small area parcels are formed by dividing the dense tile along division lines that do not correspond with subtile boundaries. According to an alternative embodiment, the small area parcels are formed from aggregating adjacent subtiles such that the sum of metric values of the group of subtiles is within the range of the minimum metric and maximum metric value for a parcel. In yet another embodiment, the small area parcels may have shapes other than rectangular.

The above parcelization method for forming small area parcels organizes the dense tile into a grid of subtiles (see FIG. 5). In one embodiment, the method divides the dense tile into the grid of subtiles. Alternatively, the method places a predetermined grid of subtiles having a predetermined size and shape over the dense tile. The grid described above in conjunction with FIG. 5 comprises fixed size rectangular subtiles. In alternative embodiments, the grid may be comprised of subtiles having other shapes and other sizes. Generally, the preferred shape for the subtiles is a rectangular shape, such as squares and rectangles, although other shapes may be used. Alternatively, subtiles may have irregular shapes. For example, the subtiles may be defined by municipal boundaries or along major road segments. The size of the subtiles may be determined depending on several factors including the size of the geographic region represented by the dense tile, the amount of data in the dense tile, the desired data size of a parcel or any other factor. In one embodiment, the subtile size is selected to be small enough such that the metric value of the subtile does not exceed the maximum metric value for a parcel. In another embodiment, the subtile size is selected as a binary power of the unit system to allow easy manipulation with the computing platform. An advantage of the fixed sized rectangular subtiles as depicted in FIG. 5 is the ability to easily convert between a location in latitude and longitude coordinates and the subtile containing the location using the latitude and longitude coordinates of the origin and the size of the tiles and subtiles.

In another embodiment, the size of the subtile is selected to be approximately equal to a maximum change in latitude that would be displayed for a given map zoom level for displaying a map from the geographic database. For example, assume a navigation system has a display measuring 12 cm (horizontal) by 9 cm (vertical). At a given zoom level, the change in latitude that would correspond to 12 cm on the display is determined. (The greater of the horizontal and vertical measurements is used in order to provide for reorientation of direction on the display.) This change in latitude may be approximately the height of the subtiles.

It is intended that the foregoing detailed description be regarded as illustrative rather than limiting and that it is understood that the following claims including all equivalents are intended to define the scope of the invention.

I claim:

1. A method of organizing map data on a physical storage medium, wherein the map data represent geographic features located in a geographic region, the method comprising:

identifying at least one dense area in the geographic region, the map data representing the geographic features within said dense area having a data size exceeding a predetermined maximum size for a predetermined sized geographic area of the region;

subdividing the map data representing the geographic features within the dense area into parcels so that the portion of map data contained in each parcel is close to a predetermined parcel size;

subdividing the map data less the map data representing the dense area into parcels so that the portion of map data contained in each parcel is close to the predetermined parcel size; and locating the map data in each parcel together on the physical storage medium.

2. The method of claim 1 wherein the dense area is a metropolitan area.

3. The method of claim 1 wherein the portion of map data contained in each parcel exceeds a predetermined minimum parcel size and is less than a predetermined maximum parcel size.

4. The method of claim 1 wherein the parcels have a rectangular shape.

5. The method of claim 4 wherein each parcel has an aspect ratio less than a predetermined maximum value.

6. The method of claim 1 wherein the dense area is located within a geographic area encompassed by one of the parcels and the map data representing the geographic features within the dense area are excluded from the portion of map data contained in said parcel.

7. The method of claim 1 further including organizing the map data representing the region into a grid of tiles, each of the tiles encompassing a geographic area defined by grid boundary lines.

8. The method of claim 7 wherein the subdividing the map data less the dense area into parcels is performed along the grid boundary lines.

9. The method of claim 7 wherein the tiles have a fixed size.

10. The method of claim 1 wherein said step of identify the dense areas comprises:

organizing the map data into a grid of tiles;

for each tile, calculating a metric value estimating an amount of map data within the tile; and identifying each tile having the metric value greater than a maximum metric value as said dense area.

11. The method of claim 1 wherein the step of subdividing the dense areas into parcels comprises organizing the map data representing the geographic features within the dense areas into a grid of subtiles, each of the subtiles encompassing a geographic area defined by grid boundary lines, wherein the subdividing the dense areas into parcels is performed along the grid boundary lines.

12. The method of claim 1 wherein the step of subdividing the dense areas into parcels comprises the steps of:

organizing the map data representing the geographic features within the dense area into a plurality of separate rows, wherein each row has a size that corresponds to a multiple of a first dimension in a first coordinate direction and that extends across the region of the dense area in an perpendicular coordinate direction; and separating the map data contained in each row into separate parcels.

13. The method of claim 12 wherein the first dimension corresponds to a maximum change of coordinate direction that can be displayed on a display screen of a navigation system.

14. The method of claim 1 wherein the physical storage medium is a CD-ROM disk.

15. The method of claim 1 wherein the physical storage medium is a DVD-ROM disk.

16. The method of claim 1 wherein the physical storage medium is a hard disk.

17. A map database product formed according to the method of claim 1.

18. A navigation system having map data organized according to the method of claim 1.

19. A method of storing map data on a physical storage medium, the map data represent geographic features located in a region, the method comprising:

organizing the map data into a grid of tiles;

for each tile, calculating a metric value estimating an amount of data contained within the tile;

identifying at least one dense tile having a metric value exceeding a predetermining maximum metric value;

forming a plurality of small area parcels from the map data contained within the dense tile, the portion of map data contained in the small area parcel is approximately equal to a predetermined parcel size; and forming a plurality of large area parcels from the map data less the map data contained within the dense tiles, the portion of map data contained in the large area parcel is approximately equal to the predetermined parcel size.

20. The method of claim 19 wherein the tiles have a rectangular shape.

21. The method of claim 19 wherein the tiles have a fixed size.

22. The method of claim 19 wherein the large area parcels comprise at least one tile.

23. The method of claim 19 wherein the large area parcels comprise a rectangular grouping of the tiles.

24. The method of claim 19 wherein the dense tile is located within a geographic area encompassed by one of the large area parcels and the map data contained within the dense tile is excluded from the portion of map data contained in said large area parcel.

25. The method of claim 19 wherein the step of forming the small area parcels comprises organizing the map data of the dense tile into a grid of subtiles, each of the subtiles encompassing a geographic area defined by subtile grid boundary lines, wherein the subdividing the dense tile into parcels is performed along the subtile grid boundary lines.

26. The method of claim 25 wherein the small area parcels comprise a rectangular grouping of the subtiles.

27. The method of claim 19 wherein the step of forming the small area parcels comprises the steps of:

organizing the map data within the dense tile into a plurality of separate rows, wherein each row has a size that corresponds to a multiple of a first dimension in a first coordinate direction and that extends across the region of the dense tile in an perpendicular coordinate direction; and separating the map data contained in each row into separate small area parcels.

\* \* \* \* \*